US008910141B2

(12) United States Patent
Bahls et al.

(10) Patent No.: US 8,910,141 B2
(45) Date of Patent: Dec. 9, 2014

(54) DISTRIBUTION OF SOFTWARE UPDATES IN WIRELESS MULTIHOP NETWORKS

(71) Applicant: Cooper Technologies Company, Houston, TX (US)

(72) Inventors: Thomas Arthur Bahls, Gaithersburg, MD (US); Shravan Rangarju, Clarksburg, MD (US)

(73) Assignee: Cooper Technologies Company, Houston, TX (US)

( * ) Notice: Subject to any disclaimer, the term of this patent is extended or adjusted under 35 U.S.C. 154(b) by 67 days.

(21) Appl. No.: 13/666,529

(22) Filed: Nov. 1, 2012

(65) Prior Publication Data

US 2014/0123123 A1    May 1, 2014

(51) Int. Cl.
*G06F 9/44* (2006.01)
*G06F 9/445* (2006.01)

(52) U.S. Cl.
CPC ... *G06F 8/65* (2013.01); *G06F 8/71* (2013.01)
USPC ........................................................ 717/170

(58) Field of Classification Search
USPC ........................................................ 717/170
See application file for complete search history.

(56) References Cited

U.S. PATENT DOCUMENTS

| | | | |
|---|---|---|---|
| 5,903,566 A | 5/1999 | Flammer, III | |
| 6,411,967 B1* | 6/2002 | Van Renesse | 707/625 |
| 6,523,044 B1 | 2/2003 | Muramoto et al. | |
| 7,260,818 B1* | 8/2007 | Iterum et al. | 717/170 |
| 7,626,931 B2 | 12/2009 | Wu et al. | |
| 8,024,724 B2 | 9/2011 | Garrison Stuber et al. | |
| 8,516,470 B1* | 8/2013 | van Rietschote et al. | 717/168 |
| 2008/0084855 A1 | 4/2008 | Rahman | |
| 2008/0209413 A1 | 8/2008 | Kakumani et al. | |
| 2009/0106403 A1* | 4/2009 | McGee et al. | 709/221 |
| 2010/0313063 A1* | 12/2010 | Venkataraja et al. | 714/4 |
| 2011/0131134 A1 | 6/2011 | Ferris et al. | |
| 2011/0314464 A1 | 12/2011 | Lee et al. | |
| 2012/0110150 A1* | 5/2012 | Kosuru et al. | 709/221 |
| 2012/0198435 A1 | 8/2012 | Dirstine et al. | |
| 2013/0339941 A1* | 12/2013 | Shelton, Daniel | 717/172 |
| 2014/0123123 A1 | 5/2014 | Bahls | |

FOREIGN PATENT DOCUMENTS

WO    WO2012084724    6/2012

OTHER PUBLICATIONS

Hui, Jonathan, "Deluge 2.0—TinyOS Network Programming.", Jul. 28, 2005. 12 pages.
Written Opinion and International Search Report for International Application No. PCT/US2012/063068 mailed Aug. 20, 2014.

* cited by examiner

*Primary Examiner* — Philip Wang
(74) *Attorney, Agent, or Firm* — Patterson Thuente Pedersen, P.A.

(57) ABSTRACT

Propagation of software updates in a wireless mesh network is handled according to an "informed push" model. Nodes are given the software update that they need, but this is done in response to a sequence of propagating reports on the need for the upgrade (i.e., that node devices have old versions). Each node device executes a reporting cycle in which a report is sent to its neighbors that indicates the types and versions of software items that reside on the device; and for non-resident software items, the lowest versions of which the node device received knowledge from its neighbors. If a node device determines that its reporting neighbor has an old version of a software item and the node device contains a newer version of that software type residing locally, then it sends its neighbor the upgrade. Otherwise, the node "gossips" about the old version to its own neighbors.

24 Claims, 8 Drawing Sheets

DISTRIBUTION OF SOFTWARE UPDATES IN WIRELESS MULTIHOP NETWORKS

FIELD OF THE INVENTION

The invention relates generally to data communications via wireless multihop networks and, more particularly, to distributing software updates to various nodes throughout a heterogeneous wireless mesh network in an efficient manner.

BACKGROUND OF THE INVENTION

A wireless multihop communications network, such as a mesh network, includes a set of nodes capable of exchanging messages with one another over a wireless medium, typically using radio frequency (RF) airwaves. Each of the nodes can be primarily a communications device or, alternatively, the communications functionality may be secondary to its primary function. For example, in a given node, the communications circuitry can be a part of a device such as a computer system, a smart appliance, a vehicle, a media device, a piece of industrial equipment (e.g., an instrument, machine, sensor, actuator), and the like. In a mesh architecture the nodes are uniquely addressable, and able to route messages from an originating node toward the intended destination node. In general, each of the nodes can be an originating and destination node as well. Thus, nodes perform both, message forwarding, and message origination/consumption functions. This means that the communication channels can be quite busy at certain parts of the network where the message density is relatively higher than at other parts.

In addition, wireless networks in particular face other challenges. For instance, wireless links may not always be reliable: there may be intermittent interfering signals, intermittent obstructions, including large movable objects (e.g., vehicles) moving in and out of the transmission path, weather affecting the quality of radio signal propagation, etc., affecting the signal strength of transmissions seen by the receiving node. Also, certain nodes may be situated near the limits of their radio's communication range, which further compounds signal reception challenges. Elsewhere in the network, there may be a high density of devices within communication range, which results in overlapping transmissions on common channels (i.e., collisions). In noisy or otherwise error-prone communication environments, the data rate may need to be reduced to reduce the error rate. However, this results in longer-duration messages, thereby increasing the collision rate. Communications received with errors detected therein must be re-transmitted, which uses additional communication overhead in the system.

These basic challenges come into play further when the node devices of wireless mesh networks receive software upgrades from time-to-time. Software upgrades include newer versions of the system software, or firmware, which involves distributing large files of program code to multiple devices over the communications channels. This further burdens the communications capacity of the mesh network, especially given the volume of data that is transferred to each device.

In homogeneous networks where there the node devices are all of one common type, it is accepted that the software upgrades are a necessary load, and a network of this type spreads the software upgrade to every device throughout the network. In networks having more than one type of node device, referred to heterogeneous networks, different types of node devices require correspondingly different types of software, each with its own independent updating schedule.

Distributing software throughout the network to different devices presents its own challenges. Simply distributing a particular type software to every node device throughout the heterogeneous network, as would be done in a homogeneous network, wastes resources in transmitting and that software to node devices of an incompatible type. Software upgrades of a certain type can be sent by a distribution node addressed to individual devices requiring that type of software in point-to-point fashion; however, in a multi-hop mesh network, this means transmitting the large amount of data, each time, through devices situated along a routing path between the distribution node and the destination nodes. This avoids having to distribute a software upgrade to devices that do not use that type of software, but it still involves wasteful duplication of transmission through certain parts of the mesh network. Also, such software upgrades would generally be controlled by some centralized upgrade server node having a specialized process or database with knowledge of the network topology and the current characteristics of each node, which requires additional resources in setup and management. Also, such a centralized approach may not always be practical in certain networks that use distributed routing schemes.

Another approach that has been used is to operate node devices of different types as co-located but independent homogeneous networks. Software upgrades are thus distributed to all devices of each independent homogeneous network. One limitation with this approach is that all nodes of such independent homogeneous networks must be within communication range of other nodes of the same type so that each node can receive upgrades from its neighbor. Put another way, a node could never be isolated from other nodes of the same type. In networks where this condition cannot be met, each isolated pocket of one or more nodes must be seeded with a software upgrade each time the software is revised. As node devices can be added to, or moved around in, the network, management of software upgrades can become increasingly difficult.

A solution is therefore needed that avoids one or more of the problems outlined above, while providing effective and efficient software upgrading in heterogeneous wireless mesh networks.

SUMMARY OF THE INVENTION

Aspects of the invention are directed to propagation of software updates in a wireless mesh network. In one embodiment, this is handled according to an "informed push" model. Nodes are given the software update that they need, but this is done in response to a sequence of propagating reports on the need for the upgrade (i.e., that node devices have old versions). Each node device executes a reporting cycle in which a report is sent to its neighbors that indicates the types and versions of software items that reside on the device; and for non-resident software items, the lowest versions of which the node device received knowledge from its neighbors. If a node device determines that its reporting neighbor has an old version of a software item and the node device contains a newer version of that software type residing locally, then it sends its neighbor the upgrade. Otherwise, the node "gossips" about the old version to its own neighbors.

According to one such embodiment, in a multihop network that includes a plurality of nodes, each node being within communication range of its immediate one or more neighboring nodes, a method for distributing software upgrades within the network includes propagating (by the nodes in the network) knowledge about early versions of software. Each of the nodes incorporates knowledge gained from its neighboring nodes into its own knowledge (to be reported in a future reporting cycle). The nodes of the network propagate software updates of later versions of the software such that each of the software upgrades is transmitted (by a node on which the upgrade resides) to only those neighboring nodes that have reported knowledge about an earlier version of that software.

In a related embodiment, the method includes storing, by at least some of the plurality of nodes, software of more than one type, where each of the plurality of nodes stores at least a native type of software, and the at least some of the plurality of nodes additionally store one or more non-native types of software. In this approach, the propagating of the knowledge and of the software updates includes propagating, by various nodes, software types that include non-native software types.

According to another aspect of the invention, in a multihop network that includes a plurality of nodes, including nodes of different types that execute correspondingly different types of software, each node being within communication range of its immediate one or more neighboring nodes, a method for distributing software upgrades within the network includes storing (on a first node) software of a first type and software of a second type, where the software of the first type is native to the first node and the software of the second type is not native to the first node.

The method further includes receiving (by the first node) version information representing software types and corresponding versions, from a neighboring second node, the version information including information corresponding to the second type of software. Further, the first node compares received version information corresponding to the second type of software against version information corresponding to a locally-stored copy of the second type of software that is stored on the first node. In response to a result of the comparing being indicative of the received version information corresponding to the second type of software representing an older version of the second type of software than the version information of the locally-stored copy of the second type of software, the first node sends an upgrade for the second type of software to the neighboring second node.

In another aspect of the invention, a node device for use with a multihop network includes communication circuitry, and a controller interfaced with the communication circuitry, the controller including a processor and a non-transitory data storage arrangement containing instructions executable on the processor, that, when executed, cause the controller to implement a software upgrade module. The software upgrade module includes a software version info module configured to obtain and store knowledge of various software types and versions thereof, a version info reporting module configured to send reports to neighboring nodes indicating the node device's knowledge of various software types and versions thereof, a software upgrade storage module configured to store a plurality of distinct types of software, a software dissemination module configured to send software upgrades of selected ones of the plurality of distinct types of software stored by the software upgrade storage module, and a decision module configured to evaluate software version info obtained from the neighboring nodes against prior knowledge of the software types and their versions, and to determine responsive actions based on the evaluation; wherein in response to a determination that an older version of a first type of software resides on another node device than a version of which the node device has knowledge, the decision module initiates action by the version info reporting module to report an existence of the older version.

One advantage of the informed push approach is that the nearest node having updated software to a node that still lacks that upgrade can supply the software upgrade, thereby reducing the burden on the network to transmit the upgrade over multiple hops. Moreover, the upgrade can be provided only along the needed path(s), without wasting network resources on propagating the upgrade along paths that do not have nodes requiring that upgrade. Another advantage lies in caching of the propagated upgrades: new node devices that are added can more efficiently obtain software upgrades from nearby nodes having cached upgrade data. Other advantages will become apparent from the following Detailed Description of the Preferred Embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Aspects of the invention are generally directed to distribution of software upgrades in a heterogeneous wireless multihop network. A multihop network is one where node devices transmit data messages to one another, including through intermediate node devices that can act as routing devices for purposes of relaying data messages towards their final destination, which can be an endpoint node device on the local network, or a gateway node device that provides a connection between the local network and another network. A well-known example of a multihop network is the mesh network topology. Embodiments of the invention may be used in a variety of applications involving data communications. One such application is in energy metering, such as a radio frequency (RF) Mesh advanced metering infrastructure (AMI) network that can provide utilities with a single integrated-mesh network for electric, water and gas data communications with the ability to support multiple meter vendors. Such systems can be deployed using a licensed or unlicensed RF band. However, it should be understood that the principles of the invention are applicable in a variety of different applications besides energy metering.

A heterogeneous network is one where there are node devices of different types that communicate with each other over the network. Thus, for example, a node of type A may originate a message destined to a node of type B. In another example, a message may be routed to a node of type A, and along the routing path of that message may be a node of type B, which participates in forwarding the message towards its destination.

Figure 1:
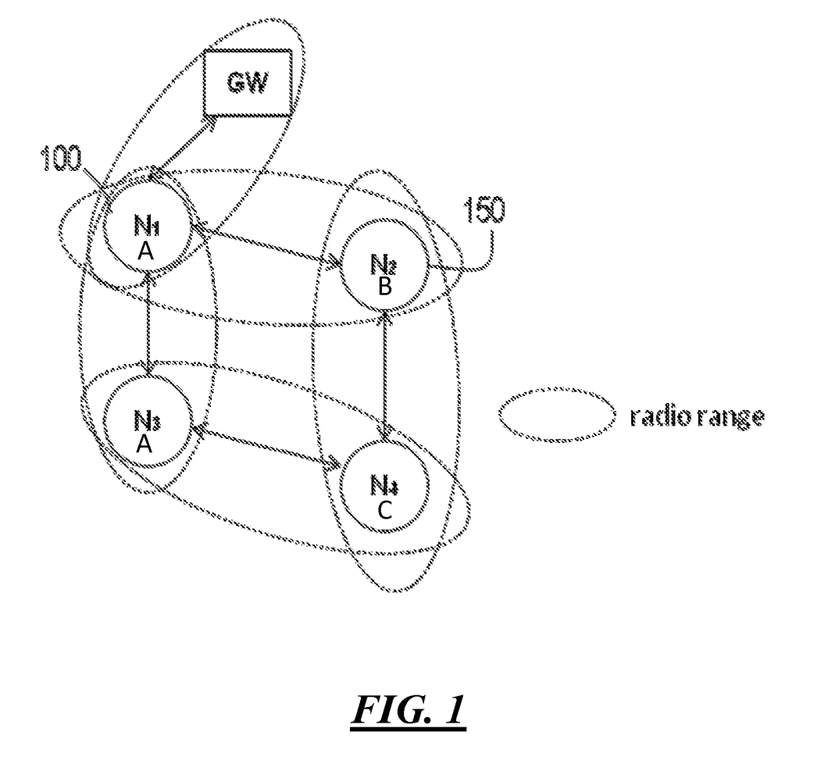
FIG. 1 is a network topology diagram illustrating an exemplary wireless multihop network in which embodiments of the invention may be applied.

FIG. 1 is a diagram illustrating an exemplary wireless multihop network. Endpoint node devices $N_1$-$N_4$ act as sources and destinations of data to be communicated, as well as relays of data to be forwarded to its destination. Gateway node device GW provides a connection between the local network and another network. The areas shown in broken lines represent the radio ranges for the various nodes devices. Those node devices which are within radio range are referred to herein as neighboring devices or, simply, neighbors. Thus, devices $N_1$ and $N_2$, within communications range of each other, are indicated respectively by reference numerals 100 and 150. Also, the node devices depicted in FIG. 1 are of different types, as indicated by reference letters A, B, and C. Being of different types means having different system software or firmware. Hereinafter, software, firmware, program instructions, and the like, on a node device will be simply referred to as software. Node devices N1, N2, and N4, being of different types, may be from different manufacturers, or may be different classes of node devices. For example, one might be an endpoint device, another might be a routing-only device. Different types of devices might also represent node devices of different models that require correspondingly different software.

Figure 2:
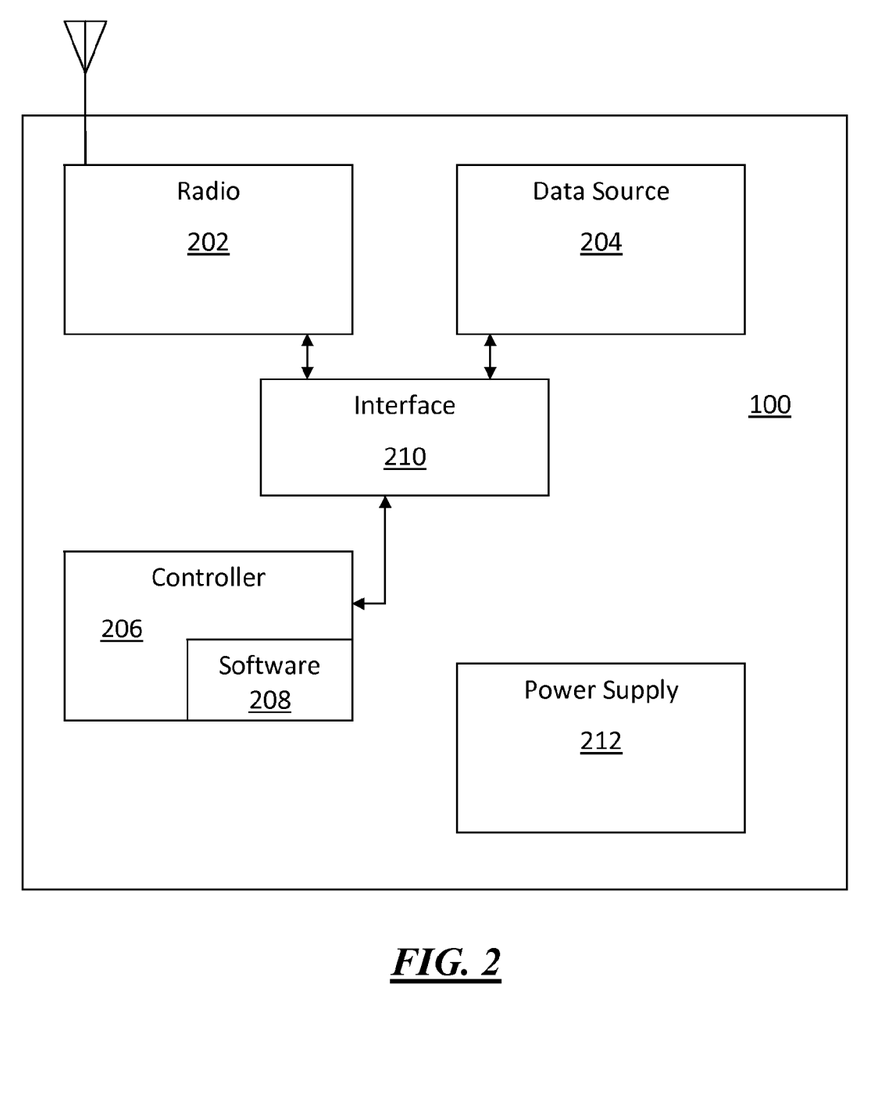
FIG. 2 is a block diagram illustrating parts of an exemplary node device according to one embodiment of the invention.

FIG. 2 is a block diagram illustrating portions of node device 100. Node device 100 includes radio circuit 202 having transmitter and receiver portions. In one example embodiment, the radio circuit is a 50-channel frequency hopping spread spectrum radio. Data source 204 is that portion of node device 100 which is served by radio circuit 202, and provides any one or more of a variety of primary functions of node device 100 besides the communication function. For example, in an AMI application, data source 204 may be a utility meter; in an industrial control application, data source 204 may be an instrument, sensor, or actuator; in an information technology application, data source 204 may be a computer system.

Controller 206 oversees and coordinates functionality of radio circuit 202 and, in some architectures that integrate the communications portion and data source portions of node device 100, controller 206 controls the operation of data source 204. In other embodiments, data source 204 can have its own controller. In one embodiment, controller 206 includes processing hardware, such as one or more processor cores, memory units (volatile, non-volatile, or both), input/output facilities, data bus, and other such processing-related components. Controller 206 also includes software 208, which in various embodiments can include an embedded system, an operating system, device drivers, and other system code. In addition, software 208 includes application-level code that defines the higher functionality of node device 100, including operation of the communications and software upgrade modules detailed hereinbelow. Interface circuit 210 facilitates input and output of application and control data between radio circuit 202 and data source 204 according to the embodiment depicted in FIG. 2. In one embodiment, interface circuit 210 includes an digital to analog (D/A) or analog to digital (A/D) circuit, or both. In related embodiments, interface circuit 210 can include one or more of: a bus circuit, a serial port, a parallel port, or any combination thereof.

Power supply circuit 212 provides electrical power for use by the other circuitry of node device 100. Various circuitry may have different power requirements, such as different supply voltages, source or ground isolation, or the like. Accordingly, power supply 212 provides the needed power requirements. In one embodiment, power supply circuit 212 includes the energy source, such as a battery, for example. In other embodiments, power supply 212 includes a power capture circuit such as a photovoltaic cell, for example, or an electrical generator circuit. In still other embodiments, power supply circuit 212 relies on externally-supplied power, such as from an AC mains source, and converts and conditions that power to the various supply taps for the other portions of node device 100.

Figure 3:
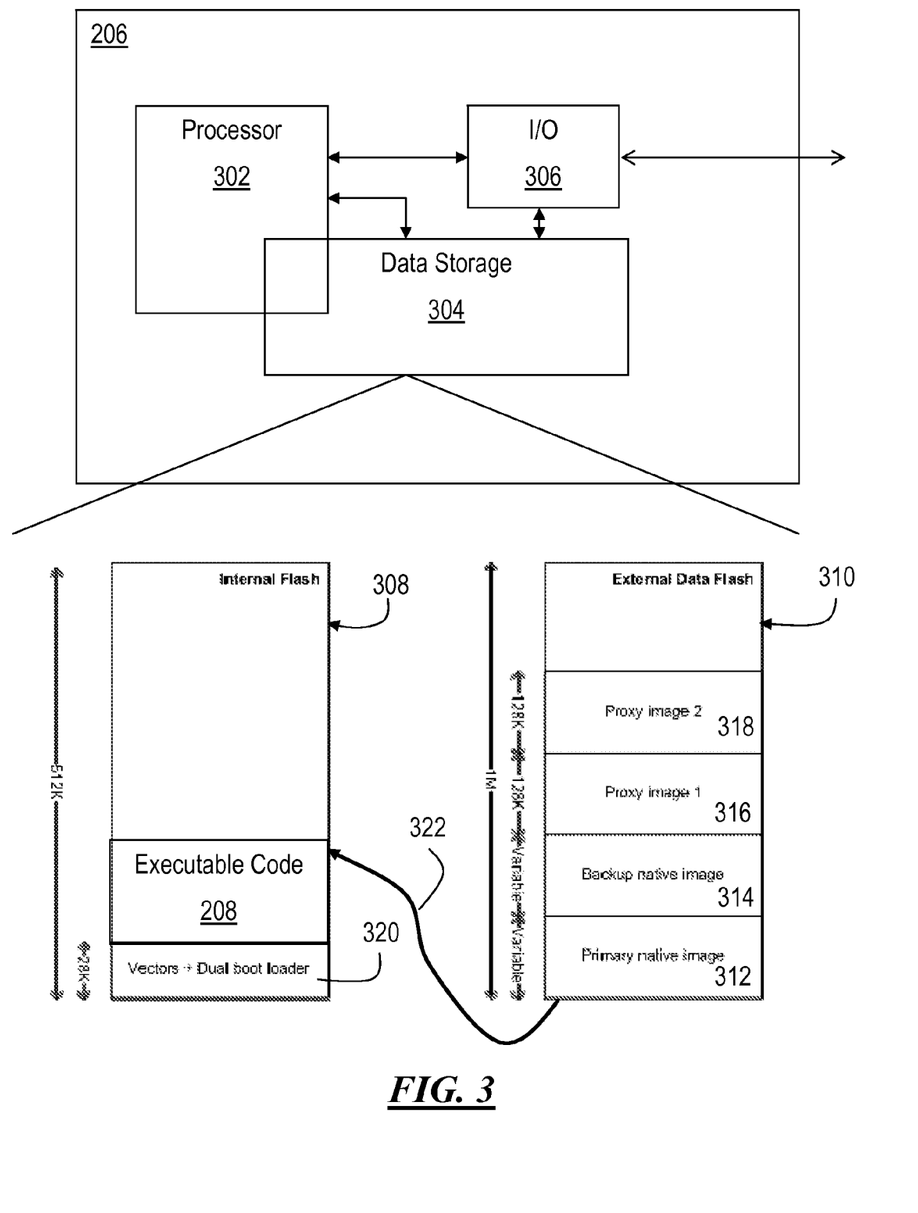
FIG. 3 is a block diagram illustrating parts comprising the controller of the exemplary node of FIG. 2, along with an example of software storage.

FIG. 3 is a block diagram illustrating some of the components of controller 206 according to one embodiment. Controller 206 includes processor 302, which includes such parts (not shown) as a control unit, an arithmetic/logic unit (ALU), registers, cache memory, and the like. Processor 302 can include a single or multi-core processor of any suitable architecture (e.g., RISC/CISC), a microcontroller with integrated additional components, a digital signal processor (DSP), etc. Processor 302 is interfaced with data storage 304, which can take any of a variety of suitable forms, and their combinations. For example, RAM, electrically-erasable programmable read-only memory (EEPROM)—e.g., Flash, disk, and the like, or a combination thereof. In the case of a microcontroller embodiment, some of the data storage 304 may be integrated with the control unit and ALU, and other components, as represented by the partial overlap of these blocks in FIG. 3. Some parts of the data storage 304 may be situated externally to the processor 302. Input/output facilities 306 include circuitry such as a system bus interface that permits interfacing with other components of node device 100, including some portions of data storage 304 (such as the case with an external flash device interfacing via system bus).

Also depicted in FIG. 3 is an exemplary organization of content within data storage 304 according to one embodiment. In this example, data storage 304 includes an internal flash device 308, which may be part of a microcontroller embodiment of processor 302, and an external flash device 310 otherwise interfaced with processor 302. External flash device 310 contains images of software 312-318. A software image in the present context refers to a complete set of operating software instructions for node device 100. The software images may be stored in a compressed or non-compressed representation.

In one type of embodiment, data storage 304 contains not only a native image of software that is executable on processor 302, but is also configured to store proxy images of software 318 and 318 executable on other types of node devices (and not executable on processor 301 of the local node device). As will be discussed in greater detail below, storage of the proxy images 316, 318 may be long-term or for more limited periods of time, and enables certain efficiencies to be achieved in the distribution of software upgrades in heterogeneous networks.

In a related embodiment, as further depicted in FIG. 3, the native software image is stored as two distinct copies, primary native image 312, and backup native image 314. In this embodiment, if primary native image 312 fails to be validated, or fails to operate normally, processor 302 will respond by using backup native image 314 in its place. This is achieved using a dual boot loader 320, which contains executable instructions to load instructions from either the primary native image 312, or the backup native image 314, into operating memory in internal flash device 308 as appropriate, to be executed by processor 302. Validation of the primary native image 312 and backup native image 314 may be performed using a cyclical redundancy check (CRC), digital signature techniques, or any other suitable technique known in the art or later developed. Upon loading of the appropriate native image for execution, indicated at 322, the instructions (which form software 208) are executed to institute operation of the node device 100.

With reference specifically to the functionality implemented by controller 206 operating under the control of the program instructions of software 208, a variety of operational modules are implemented. The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor core(s) of controller 206. Accordingly, each module can be realized in a variety of suitable configurations, and should not be limited to any particular implementation exemplified herein.

The operational modules in one example embodiment, include such operations as communications (including forming message packets, forwarding messages addressed to other devices, message routing, error detection/correction, packet framing, following communications protocol, etc.), operation of data source 204, various security-related operations, receiving and processing commands, performing software upgrading-related operations, and others.

With regard to the software upgrading-related operations, from time-to-time, the native software, or portions thereof, undergo upgrading. In the present context, the term software upgrade refers to both, software updates (which is often defined as referring to relatively minor changes to software code or parameters), and software upgrades (often defined as referring to major replacement of large parts, or all, of the software).

Figure 4:
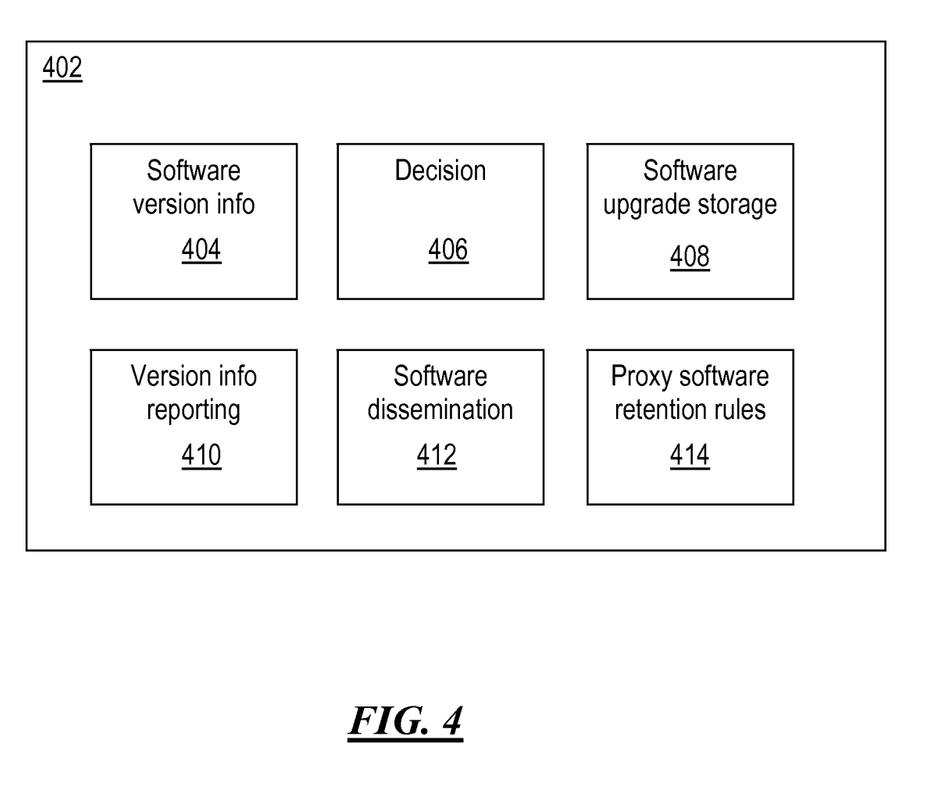
FIG. 4 is a block diagram illustrating the components of a software upgrade module according to one embodiment of the invention.

FIG. 4 is a block diagram illustrating the components of a software upgrade module 402 according to one embodiment. In one embodiment, software upgrade module 402 is implemented by program instructions being executed on controller 206, such as program instructions in executable code 208. In the embodiment depicted, software upgrade module 402 is itself composed of individual modules that perform various types of operations. It should be understood that the particular software architecture described with reference to FIG. 4 is but one example of an embodiment. In other contemplated embodiments, the functionality described below may be combined into fewer distinct modules, or split among a plurality of other modules.

Software upgrade module 402 includes software version info module 404, which is tasked with obtaining and storing knowledge of the various software types and their versions. As will be described in greater detail below, in one type of embodiment, the node devices report their respective knowledge of software types and their versions to their neighbors in a process that propagates knowledge of old versions. Other node devices receiving reports of such knowledge of old versions can determine if they have a newer version of a particular software type, and provide that version to be passed to the neighbor from which the old version knowledge was received. Software version info module 404, in various embodiments, can use a list, a database, an array, or any suitable data structure to keep track of software types and versions for itself and its neighbors.

Table 1 below provides an example of software version info maintained by software version info module.

TABLE 1

Example of Software Version info

| Software Type | Software Ver. | Neighbor ID | Resident? |
|---|---|---|---|
| A (Native) | 2.0 | — | Y |
| B | 1.50 | 123 | N |
| B | 1.45 | 456 | N |
| C | 3.31 | 456 | Y |
| A | 1.95 | 789 | N |

In this example embodiment, the software version info is maintained at a node device. Each item indicates, the type of software, its version, the neighboring node ID from which that information was received (not necessarily a node device which uses or even has a copy of that version), and an indication of whether a copy of that software type and version resides locally on the present node device. Notably, multiple different software types are tracked. Also, a node may have knowledge of more than one version of a given software type, as exemplified in the cases of types A and B in Table 1. Moreover, it should be apparent from this example that more than one software type can be resident on a given node device, although there will generally be only one type that is native to (i.e., executable on) any given node device. When a particular neighbor node device acquires a software upgrade and that upgrade is reported in a subsequent reporting cycle, the entry in the data structure corresponding to that neighbor ID and that software type is updated to reflect the newer version of that software type.

Decision module 406 evaluates upgrade-related information received, and coordinates responsive actions to be taken. The upgrade-related information that is received includes software version info in reports from neighbors (indicating knowledge of software types and their versions), as well as the software items themselves. Notably, the software items may be complete images of software versions, or may be upgrade instructions that, when executed, modify a native image on a node device to institute the upgrade. Decision module 406 determines if software type information is native or proxy, and determines if a local upgrade needs to be performed in response to a received native software type. Also, decision module 406 evaluates received reports on knowledge of software types and revisions, and determines if the local software version info data store structure to be updated. Moreover, decision module 406 determines whether any of the locally-residing software images or upgrades should be sent to a particular neighboring node to help disseminate newer versions.

Software upgrade storage module 408 manages the data store of native and proxy software types. These software items are stored in one or more non-volatile data storage devices such as the examples described above. Version info reporting module 410 handles sending reports to neighboring node devices indicating the local node's knowledge of various software types and versions thereof. Reporting may be done periodically, or in response to certain triggering events, such as receiving a command. Software dissemination module 412 is configured to send software items (i.e., images or upgrades) to a neighboring node device in response to a determination by decision module 406 that knowledge of a lower version of a resident software was received from that neighboring device.

Proxy software retention rules module 414 maintains rules relating to retaining non-native software on the local node device, and enforces those rules. Assuming a node device has ample or unlimited storage space, it could store all types of software as a proxy device. This would allow the node device to provide newer software for a node device that has an older version without requiring transmission of that software upgrade from a more distant node. However, in practice, the amount of non-volatile storage in a node device is limited, and the node device may need to use that space for functions other than supporting upgrading software for the benefit of remote nodes. Accordingly, the retention rules may define conditions for deleting stored proxy software. In one example, the retention rules may specify a period of time such as a week, month, etc., during which time the proxy software is to be retained. In another approach, which may be implemented instead of, or in addition to, the passage-of-time condition, stored software items are deleted, earliest-received first, when storage space is needed for other node device functionality.

According to one embodiment, propagation of software updates in the wireless mesh network is handled according to an "informed push" model. According to this approach, node devices are given the software update that they need, but this is done in response to a sequence of propagating reports on the need for the upgrade (i.e., that node devices have old versions). This is achieved by each node device executing a reporting cycle in which it sends a report to its neighbors that indicates (1) the types and versions of software items that reside on the device; and (2) for non-resident software items, the lowest versions of which the node device received knowledge from its neighbors. As an example, a node device running a reporting cycle that begins with the software version info in the state shown in Table 1 would report the native software, type A, at version 2.0 since it is resident. Software type A, version 1.95 is not reported because it is non-resident, and is thus superseded by the resident version. Also reported is software type C, since it is resident. Among software type B, neither of which is resident, version 1.45 is included in the report since it is the earliest version.

The neighboring node devices that receive reports will respond to those reports depending on what the reports contain. If a node device determines that its reporting neighbor has knowledge of an old version of a software item and the node device contains a newer version of that software type residing locally, then it sends its neighbor the upgrade. Otherwise, the node "gossips" about the old version to its own neighbors. In one sense, the software upgrade protocol according to one embodiment propagates knowledge of node devices having old versions, which permits the mesh network to propagate an upgrade in the direction of the node having the old software version.

Figure 5:
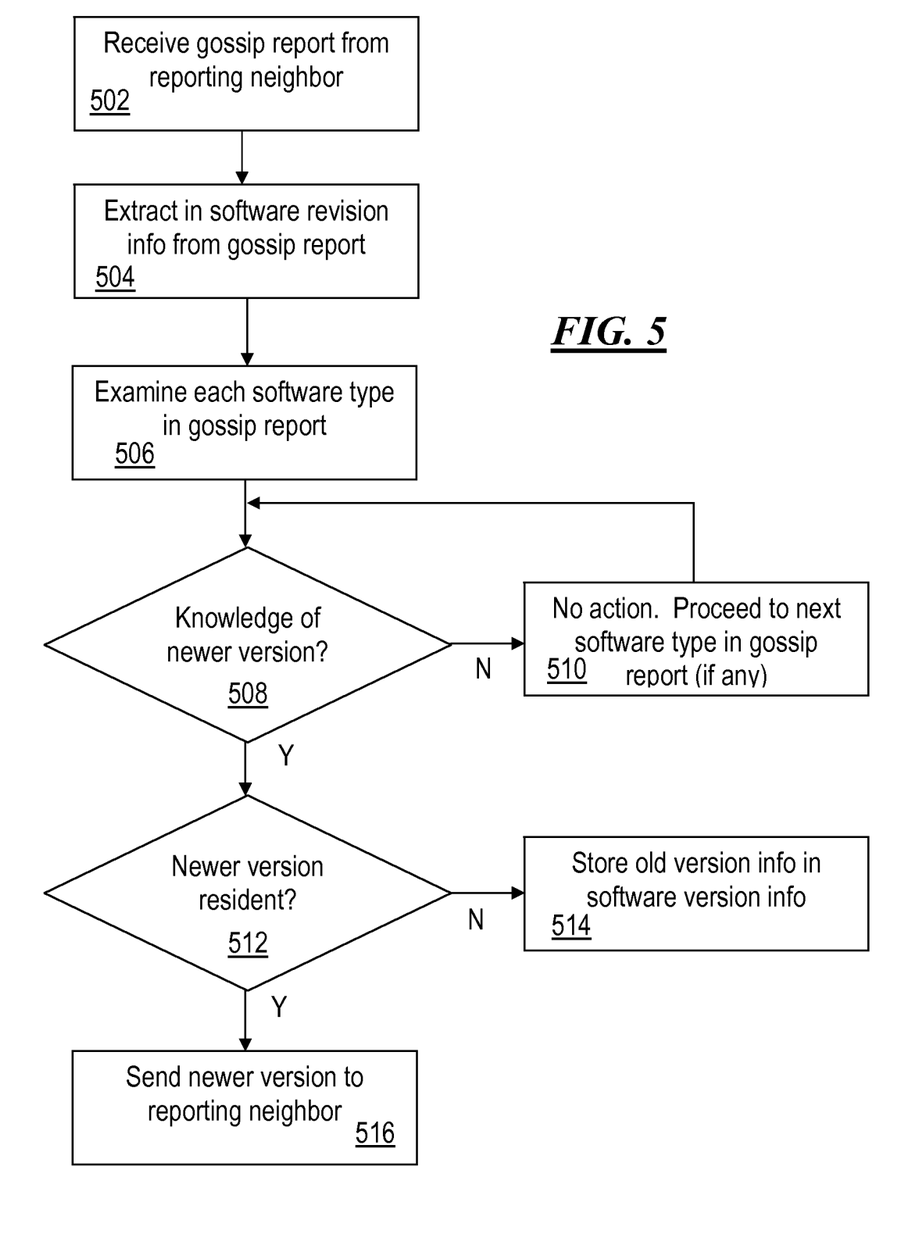
FIG. 5 is a flow diagram illustrating a process carried out by a node device for responding to a gossip report according to one embodiment of the invention.

FIG. 5 is a flow diagram illustrating a process carried out by a node device for responding to a gossip report according to one embodiment. At 502 a gossip report is received from a neighboring node device. At 504 the gossip report is parsed and the software revision info contained in that report is extracted. At 506, versions of each software type of the gossip report are compared against existing knowledge. At 508, a determination is made if the node device has knowledge of a newer version. If there is no knowledge of a newer version, then there is no action to take with respect to this software type. The process loops back to check the next software type in the gossip report, if not all have been examined at this point, as indicated at 510.

At 512, if the gossip report contained a software type for which a newer version was already known (indicating that there is an out-of date version at either the reporting neighbor, or downstream of that reporting neighbor), then an inquiry is made whether the newer version is resident on then node device. If the new version is knowledge only (i.e., non-resident), then the old version is stored in the software version info data structure, to be reported in the node device's next gossip report. If the newer version is resident on the node device, then that newer version is sent to the reporting neighbor. By this mechanism, new versions of software types are propagated towards the node reporting the old version.

Since the new versions of software are relatively large files, a related embodiment performs the transmission of upgrades using partial transfers, storage of software upgrade parts. Accordingly, the transfer of a single upgrade can take place over multiple messages and over multiple connections. To support this functionality, this embodiment defines a process of fragmentation of an upgrade, maintenance of state information of the upgrade across multiple connections until the transfer is complete, reassembly of the upgrade data after the transfer is complete, and error handling in the case when only a partial transfer is transmitted.

Figure 6:
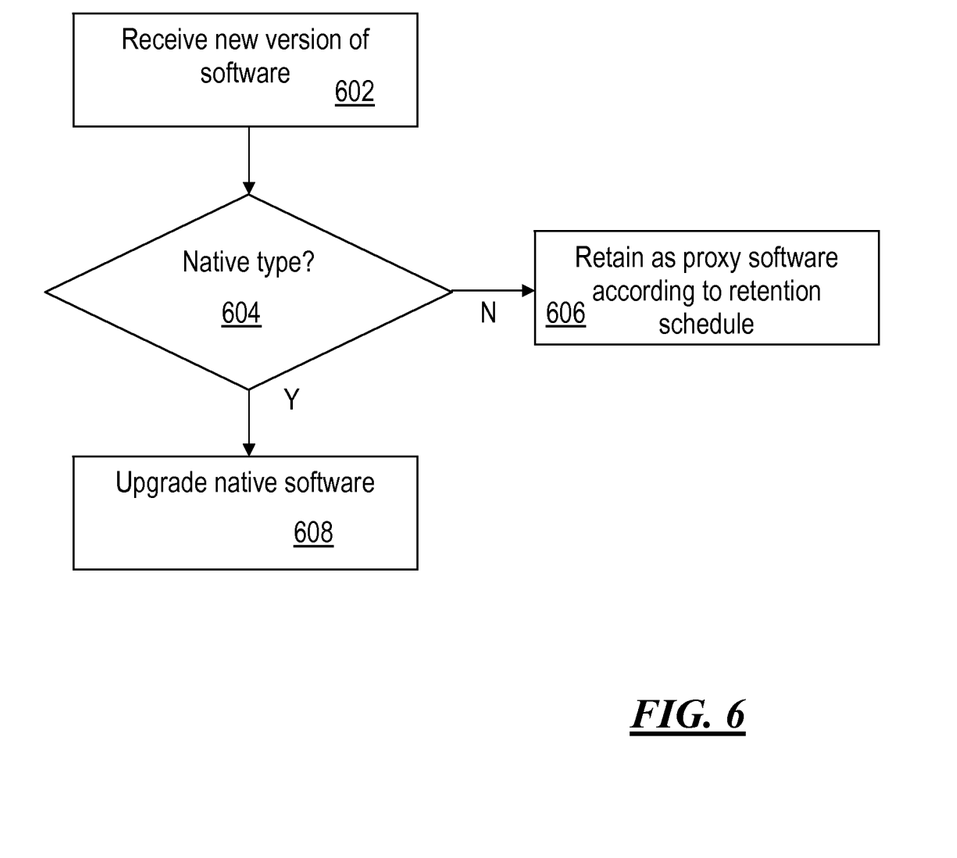
FIG. 6 is a flow diagram illustrating a process according to one embodiment that is carried out by a node device in response to receiving a new version of software pushed to it.

FIG. 6 is a flow diagram illustrating a process according to one embodiment that is carried out by a node device in response to receiving a new version of software pushed to it at 602. At 604, a determination is made if the software received is native. If it is not native, then, at 606, the received software item is retained as proxy software subject to the retention schedule. If there is an older version of the proxy software resident, then that older version can be replaced. If the received software is native, then the native software is updated at 608.

In these embodiments, the upgrading process is de-centralized. It is a distributed process that involves propagation of software version information in a way that intrinsically conveys a direction in which software upgrades are to be propagated in response. To further illustrate operation of the upgrading process, FIGS. 7A-7E illustrate the operation of a portion of a mesh network in which three devices, X, Y, and Z operate.

Figure 7A:
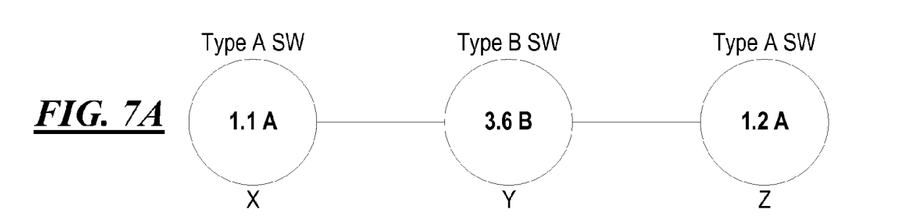
FIGS. 7A-7E illustrate the operation of a portion of a simplified mesh network according to one example embodiment.
Figure 7B:
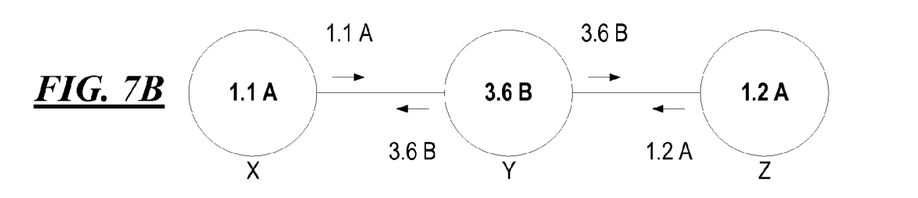
Figure 7C:
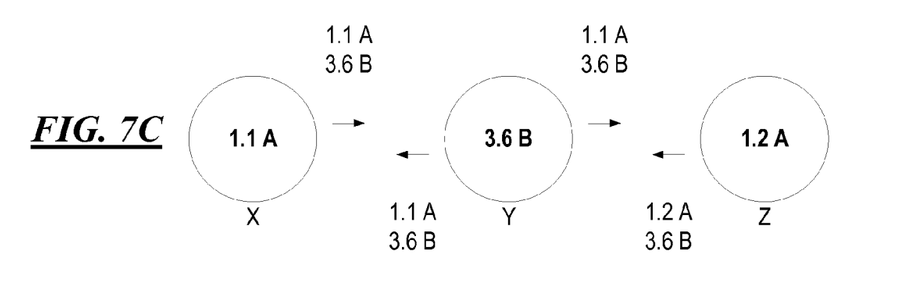

As depicted in FIG. 7A, nodes X and Y are neighbors and can exchange information about upgradable software items, as can nodes Y and Z. The native software item revision and type that currently resides on each of the nodes is indicated respectively as 1.1 A, 3.6 B, and 1.2 A. FIG. 7B depicts nodes X, Y, and Z reporting version information about the types and revisions they currently know about, initially just their own resident native types. In FIG. 7C, a subsequent reporting cycle is depicted in which nodes X, Y, and Z exchange software type and version information; this time also reporting the types and versions they have learned from their neighbors. Notably, node Y sends to node Z the version and type 1.1 A, since it is the lower of the two revisions for type A that it has learned from its neighbors.

Figure 7D:
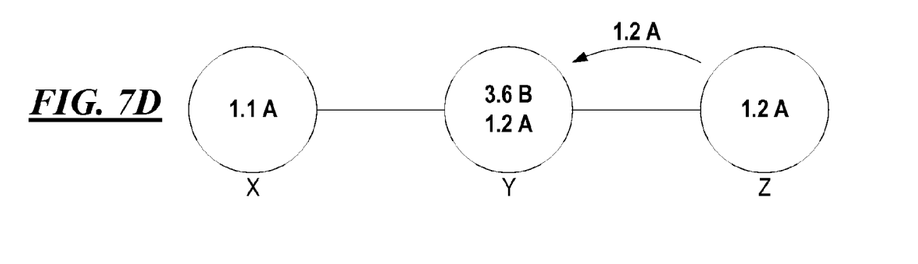
Figure 7E:
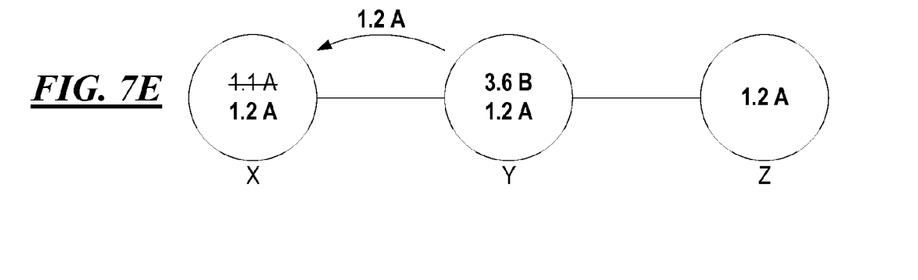

In FIG. 7D, node Z transmits version 1.2 of software type A to node Y, since it has a newer revision than that advertised by node Y. Subsequently, in FIG. 7E, node Y transmits version 1.2 of software type A to node X, since it now also has a newer revision of that item. In response, node X replaces version 1.1 of software type A with version 1.2. Since node X considers software type A to be a native type, the node performs an upgrade to that revision.

Figure 8:
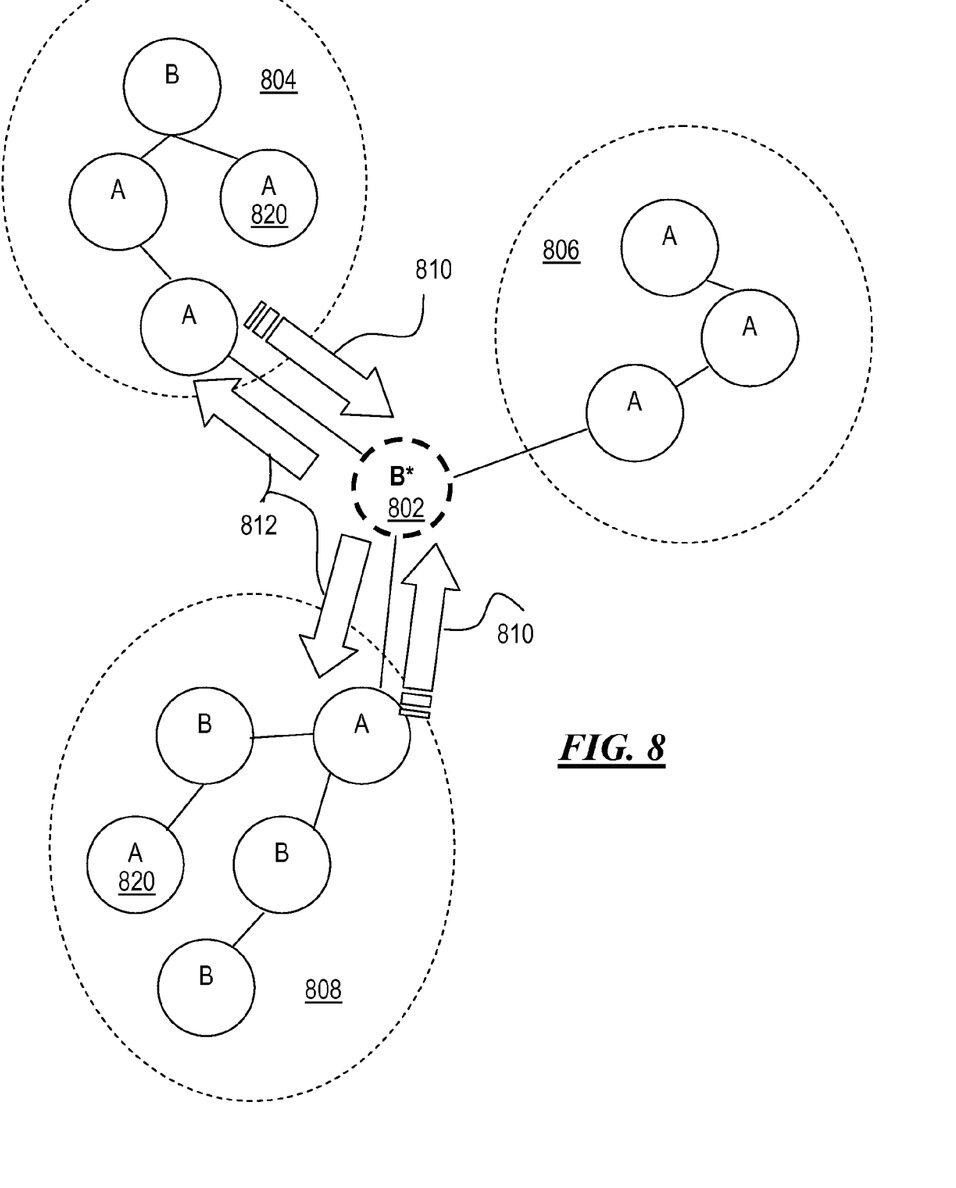
FIG. 8 is a diagram illustrating a general flow of software version knowledge and upgrades in a network according to certain aspects of the invention.

FIG. 8 is a diagram illustrating a general flow of software version knowledge and upgrades in a network according to certain related aspects of the invention. Portion 802 of the network (which can be a single node or group of nodes, or a branch, a root node, or the like) contains an upgraded version of software type B, indicated as B*. As depicted, the network in this example has three branches, 804, 806, and 808, that branch out from portion 802. In each branch are depicted several node devices. The letters A or B in each node device indicates the native software type for that node (each node can also store a proxy copy of other software types, or upgrades thereof). Branches 804 includes devices of both types, including type B nodes that require an update of software type B. Branch 806 includes only type A nodes.

As depicted by arrows 810, information about the old version of software type B propagates towards network portion 802. According to the operability of certain examples of node devices described above, each node device informs its neighbors of old versions of software in all directions, so as a whole, propagation proceeds in every direction throughout the network, until a node having a copy of upgrade for that software type in question is encountered on a particular node, or until a network boundary is reached (i.e., when a node has only one neighbor). In the present example, since the network portion 802 is already upgraded with version B*, it no longer has knowledge of the old versions from within. Thus, its knowledge of the old version of software type B is received from each of the branches 804 and 808, as depicted by arrows 810. It should be noted that, in some embodiments, branch 806 exchanges software version information with network portion 802, and the nodes of branch 806 may even receive information about the new version B*.

However, the propagation of old version B knowledge will proceed towards portion 802, from branches 804 and 808 until, at some point, a node with the upgraded software B* will respond by providing the upgrade. Since in one embodiment the upgrade is provided to those neighboring devices that report an earlier version B, then the upgraded version B* propagates generally in a direction opposite to that of the flow of old version information 810. The general, or predominant, direction of propagation of the software upgrade is represented by arrows 812.

Since branch 806 lacks any type B nodes, sending upgraded software version B* would be inefficient, unless the network type is one where nodes devices are mobile or frequently move into and out of different branches of the network. In the latter case, having the entire network flooded with the upgrade would allow for faster upgrades to newly-arriving node devices having software that needs to be upgraded.

For generally fixed, or slowly-changing networks, one embodiment involves refraining from sending the early version knowledge in gossip reports to the same neighboring device(s) from which that knowledge was received in the first place. Thus, in the example of FIG. 8, the nodes of branch 806 may receive knowledge of new version B* from one or more nodes in portion 802, but the nodes of branch 806 would not report back that same knowledge to those same nodes in portion 802. This feature can be accomplished by associating the ID of the node from which each item of software version information is received, and in forming the gossip reports, specifically excluding items of software version information if they were received only from the neighboring node to which the gossip report is to be sent. Version information from other nodes This principle can also work to prevent propagation of software upgrades to stubs that do not lead to upgradable nodes, such as nodes 820.

In a related approach, nodes devices include in their gossip reports the ID of the neighboring node device from which the knowledge of each old version was learned. Thus, each of those same neighboring nodes are each able to determine if (a) they are the sole neighboring node which provided the information; or (b) the node(s) from which the reporting node learned the old version information are also neighbors to the neighboring node. In either case, the neighboring node may conclude that the reporting node does not need to receive a copy of an upgrade.

In a related embodiment, the gossip reports are specifically directed toward a certain part of the network. This option is applicable in networks organized as a directed tree with one node as the network root that would logically be the source of new revisions. Accordingly, the gossip reports containing the oldest known version information are transmitted only along the path to the network root rather than to all neighboring nodes.

In a related embodiment, the network resources are used more economically by limiting the different software types that any one node advertises to only those along its path to the root.

In yet another embodiment, the breadth of image type propagation is constrained based on the concept of a subnet (or color) that segments the network into smaller pieces. In this embodiment, an optional color can be associated with each software item type. Nodes will limit the dissemination of a newer version to only those neighboring nodes of the same color.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded.

Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. In a multihop network that includes a plurality of nodes, including nodes of different types that execute correspondingly different types of software, each node being within communication range of its immediate one or more neighboring nodes, a method for distributing software upgrades within the network, the method comprising:
   storing, on a first node, software of a first type and software of a second type, wherein the software of the first type is native to the first node and the software of the second type is not native to the first node;
   receiving by the first node, from a neighboring second node, version information representing software types and corresponding versions, the version information including information corresponding to the second type of software;
   comparing, by the first node, received version information corresponding to the second type of software against version information corresponding to a locally-stored copy of the second type of software that is stored on the first node; and
   sending, by the first node, an upgrade for the second type of software to the neighboring second node in response to a result of the comparing being indicative of the received version information corresponding to the second type of software representing an older version of the second type of software than the version information of the locally-stored copy of the second type of software.

2. The method of claim 1, further comprising:
   storing, by the first node, a local data structure representing version information representing software types and corresponding versions, including version information for software types that do not reside on the first node.

3. The method of claim 1, further comprising:
   generating, by the first node, a gossip report representing version information representing software types and corresponding versions known to the first node; and
   in a reporting cycle, sending the gossip report, by the first node, to at least one neighboring device.

4. The method of claim 3, wherein generating the gossip report includes:
   including in the gossip report actual version information of software types that reside on the first node; and
   including in the gossip report earliest version information of software types that do not reside on the first node, the earliest version information being based on received gossip reports from neighboring nodes.

5. The method of claim 3, wherein sending the gossip report includes sending the gossip report exclusively towards a root node in the network.

6. The method of claim 3, wherein sending the gossip report includes refraining from sending the version information to the same neighboring device from which that knowledge was received in the first place.

7. The method of claim 1, wherein the software of the second type is a full image of operating software for a node.

8. The method of claim 1, wherein the software of the second type is a software upgrade representing an upgraded portion of operating software for a node.

9. The method of claim 1, wherein the second type of software is non-native to the neighboring second node.

10. The method of claim 1, wherein the received version information includes version information corresponding to a third type of software, the third type of software not being stored on the first node; and further comprising:
    storing, by the first node, a local data structure representing version information corresponding to at least the second type of software and the third type of software;
    comparing, by the first node, the version information corresponding to the third type of software against the version information corresponding to the third type of software stored in the local data structure; and
    in response to a result of the comparing being indicative of the received version information corresponding to the third type of software representing an older version of the third type of software than the version information corresponding to the third type of software stored in the local data structure, forming a gossip report to be sent to neighboring devices, the gossip report containing an indicator of the older version of the third type of software.

11. In a multihop network that includes a plurality of nodes, each node being within communication range of its immediate one or more neighboring nodes, a method for distributing software upgrades within the network, the method comprising:
    propagating, by nodes in the network, knowledge about early versions of software, wherein each of the nodes incorporates knowledge gained from its neighboring nodes into its own knowledge; and
    propagating, by nodes in the network, software updates of later versions of the software such that each of the software upgrades is transmitted to only those neighboring nodes that have reported knowledge about an earlier version of that software.

12. The method of claim 11, wherein in propagating the knowledge about early versions of software, nodes refrain from reporting knowledge about early versions of software to the same neighboring nodes from which that knowledge was received in the first place.

13. The method of claim 11, wherein in propagating the knowledge about early versions of software, a nodes includes an identifier of one or more neighboring nodes from which that knowledge was received, and wherein a first one of those neighboring nodes, in response thereto, refrains from propagating the software upgrade corresponding to that early version knowledge to the reporting node that received its early version knowledge from the first neighboring node.

14. The method of claim 11, wherein the multihop network includes branches of nodes, and wherein certain nodes require a particular software upgrade and certain other nodes do not require that particular upgrade; and
    wherein in propagating the software updates of later versions, the particular software upgrade is propagated along a first branch of nodes containing at least one node requiring the particular software upgrade until the at least one node receives that software upgrade, and the particular software upgrade is not propagated to a second branch of nodes that does not contain any nodes that require the particular upgrade.

15. The method of claim 11, further comprising:
    storing, by at least some of the plurality of nodes, software of more than one type, wherein each of the plurality of nodes stores at least a native type of software, and wherein the at least some of the plurality of nodes additionally store one or more non-native types of software; and wherein the propagating of the knowledge and of the software updates includes propagating, by various nodes, software types that include non-native software types.

16. A node device for use with a multihop network that includes nodes of different types that execute correspondingly different types of software, each node being within communication range of its immediate one or more neighboring nodes, the node device comprising:

communication circuitry, and a controller interfaced with the communication circuitry, the controller including a processor and a non-transitory data storage arrangement containing instructions executable on the processor, that, when executed, cause the controller to implement a software upgrade module that includes:

a software version info module configured to obtain and store knowledge of various software types and versions thereof;

a version info reporting module configured to send reports to neighboring nodes indicating the node device's knowledge of various software types and versions thereof;

a software upgrade storage module configured to store a plurality of distinct types of software;

a software dissemination module configured to send software upgrades of selected ones of the plurality of distinct types of software stored by the software upgrade storage module; and a decision module configured to evaluate software version info obtained from the neighboring nodes against prior knowledge of the software types and their versions, and to determine responsive actions based on the evaluation, wherein in response to a determination that an older version of a first type of software resides on another node device than a version of which the node device has knowledge, the decision module initiates action by the version info reporting module to report an existence of the older version.

17. The node device of 16, wherein the decision module is further configured to initiate action by the software dissemination module to send a resident copy of a second type of software to a neighboring node in response to reception of a report from that neighboring node indicating an older version of the second type of software.

18. The node device of 16, wherein the plurality of distinct types of software includes a native type of software executable on the node device, and a non-native type of software that is not executable on the node device.

19. The node device of 16, wherein the version info reporting module is configured to send the reports such that:

for resident software that resides on the node device, the reports include current versions of each item of the resident software; and for non-resident software that does not reside on the node deice, the reports include an earliest known version of each known type of software.

20. The node device of 16, wherein the version info reporting module is further configured to send reports exclusively toward a root node of the network.

21. The node device of 16, wherein the software dissemination module configured to send the software upgrades exclusively to a subset of other nodes within a predefined subnet color.

22. The node device of 16, wherein the software upgrades include complete images of system software for nodes.

23. The node device of 16, wherein the software upgrades include upgraded portions of system software for nodes.

24. In a multihop network that includes a plurality of nodes, including nodes of different types that execute correspondingly different types of software, each node being within communication range of its immediate one or more neighboring nodes, a method for distributing software upgrades within the network, the method comprising:

means for storing, on a first node, software of a first type and software of a second type, wherein the software of the first type is native to the first node and the software of the second type is not native to the first node;

means for receiving, by the first node, version information representing software types and corresponding versions, from a neighboring second node, the version information including information corresponding to the second type of software;

means for comparing, by the first node, received version information corresponding to the second type of software against version information corresponding to a locally-stored copy of the second type of software that is stored on the first node; and means for sending, by the first node, an upgrade for the second type of software to the neighboring second node in response to a result of the comparing being indicative of the received version information corresponding to the second type of software representing an older version of the second type of software than the version information of the locally-stored copy of the second type of software.

* * * * *